(12) United States Patent
Kupratis et al.

(10) Patent No.: US 11,066,989 B2
(45) Date of Patent: Jul. 20, 2021

(54) GAS TURBINE ENGINE ARCHITECTURE WITH NESTED CONCENTRIC COMBUSTOR

(71) Applicant: UNITED TECHNOLOGIES CORPORATION, Farmington, CT (US)

(72) Inventors: Daniel B. Kupratis, Wallingford, CT (US); Howard K. Gregory, Broomfield, CO (US)

(73) Assignee: Raytheon Technologies Corporation, Farmington, CT (US)

( * ) Notice: Subject to any disclaimer, the term of this patent is extended or adjusted under 35 U.S.C. 154(b) by 29 days.

(21) Appl. No.: 16/386,670

(22) Filed: Apr. 17, 2019

(65) Prior Publication Data

US 2020/0025070 A1 Jan. 23, 2020

Related U.S. Application Data

(62) Division of application No. 14/775,230, filed as application No. PCT/US2014/028087 on Mar. 14, 2014, now Pat. No. 10,267,229.

(60) Provisional application No. 61/782,996, filed on Mar. 14, 2013.

(51) Int. Cl.
| | |
|---|---|
| *F01D 17/16* | (2006.01) |
| *F02C 3/14* | (2006.01) |
| *F02C 9/22* | (2006.01) |
| *F02C 9/54* | (2006.01) |
| *F23R 3/42* | (2006.01) |
| *F01D 9/02* | (2006.01) |
| *F02C 5/02* | (2006.01) |
| *F01D 17/18* | (2006.01) |
| *F23R 3/46* | (2006.01) |
| *F02K 3/11* | (2006.01) |

(52) U.S. Cl.
CPC ............... *F02C 3/14* (2013.01); *F01D 9/023* (2013.01); *F01D 17/162* (2013.01); *F01D 17/18* (2013.01); *F02C 5/02* (2013.01); *F02C 9/22* (2013.01); *F02C 9/54* (2013.01); *F23R 3/42* (2013.01); *F23R 3/46* (2013.01); *F02K 3/11* (2013.01)

(58) Field of Classification Search
CPC ...... F02C 9/22; F02C 9/54; F01D 17/16–167; F01D 17/18; F01D 17/162; F02K 1/15–18; F02K 3/075; F02K 3/077; F02K 3/11; F23R 3/42; F23R 3/50
See application file for complete search history.

(56) References Cited

U.S. PATENT DOCUMENTS

| | | |
|---|---|---|
| 2,702,985 A | 3/1955 | Raymond |
| 3,677,012 A | 7/1972 | Batscha |
| 3,678,690 A | 7/1972 | Shohet |
| 3,966,352 A | 6/1976 | White |
| 3,978,664 A | 9/1976 | Parker et al. |
| 4,009,569 A | 3/1977 | Kozlin |
| 4,054,030 A | 10/1977 | Pedersen |
| 4,080,785 A | 3/1978 | Koff |
| 4,314,791 A | 2/1982 | Weiler |
| 4,380,895 A | 4/1983 | Adkins |
| 4,418,708 A | 12/1983 | Schulze et al. |

(Continued)

*Primary Examiner* — Gerald L Sung
*Assistant Examiner* — Rene D Ford
(74) *Attorney, Agent, or Firm* — Getz Balich LLC

(57) ABSTRACT

A gas turbine engine includes an inner annular combustor radially inboard of an outer annular combustor. An outer variable turbine vane array is downstream of the outer annular combustor and an inner variable turbine vane array downstream of the inner annular combustor.

15 Claims, 4 Drawing Sheets

(56) References Cited

U.S. PATENT DOCUMENTS

| | | |
|---|---|---|
| 4,458,479 A | 7/1984 | Reider et al. |
| 4,483,149 A | 11/1984 | Rider et al. |
| 4,503,668 A | 3/1985 | Duncan, III et al. |
| 4,527,386 A | 7/1985 | Markowski |
| 4,538,410 A | 9/1985 | Klaebo |
| 5,285,635 A | 2/1994 | Savelli et al. |
| 5,406,799 A | 4/1995 | Marshall |
| 5,564,898 A | 10/1996 | Richards et al. |
| 5,592,820 A | 1/1997 | Alary et al. |
| 5,592,821 A | 1/1997 | Alary et al. |
| 5,704,211 A | 1/1998 | Hatfield |
| 5,737,915 A | 4/1998 | Lin et al. |
| 5,845,482 A | 12/1998 | Carscallen |
| 6,385,959 B1 | 5/2002 | Montoya |
| 6,513,330 B1 | 2/2003 | Rice et al. |
| 6,760,971 B2 | 7/2004 | Sasu et al. |
| 7,003,958 B2 | 2/2006 | Dinu et al. |
| 7,114,255 B2 | 10/2006 | Sasu et al. |
| 7,181,914 B2 | 2/2007 | Pidcock et al. |
| 7,434,405 B2 | 10/2008 | Gukeisen et al. |
| 7,574,864 B2 | 8/2009 | Oltmanns et al. |
| 7,823,387 B2 | 11/2010 | Commaret et al. |
| 7,870,739 B2 | 1/2011 | Bland |
| 8,082,738 B2 | 12/2011 | Cornelius et al. |
| 2005/0050899 A1 | 3/2005 | Little |
| 2007/0214795 A1 | 9/2007 | Cooker |
| 2008/0098748 A1 | 5/2008 | Tangirala et al. |
| 2011/0225973 A1 | 9/2011 | Romig et al. |
| 2012/0304660 A1 | 12/2012 | Kupratis |

FIG. 4

GAS TURBINE ENGINE ARCHITECTURE WITH NESTED CONCENTRIC COMBUSTOR

This application is a divisional application of U.S. patent application Ser. No. 14/775,230 filed Sep. 11, 2015, which is a national phase application of PCT Patent Application No. PCT/US2014/028087 filed Mar. 14, 2014, which claims priority to U.S. Provisional Patent Application No. 61/782,996 filed Mar. 14, 2013, which are hereby incorporated herein by reference in their entireties.

BACKGROUND

The present disclosure relates to gas turbine engine architecture, and more particularly to a variable cycle architecture.

Variable cycle gas turbine engines power aircraft over a range of operating conditions yet achieve countervailing objectives such as high specific thrust and low fuel consumption. The variable cycle gas turbine engine essentially alters a bypass ratio during flight to match requirements. This facilitates efficient performance over a broad range of altitudes and flight conditions to generate high thrust for high-energy maneuvers yet optimize fuel efficiency for cruise and loiter operational modes.

The countervailing objectives that enable a variable cycle requires an architecture that avoids overly high temperatures upstream of the combustor section (T3) at takeoff yet also provides a high overall pressure ratio (OPR) at high altitude cruise.

SUMMARY

A gas turbine engine according to one disclosed non-limiting embodiment of the present disclosure includes an inner annular combustor radially inboard of an outer annular combustor. An outer variable turbine vane array is downstream of the outer annular combustor and an inner variable turbine vane array is downstream of the inner annular combustor.

In a further embodiment of the present disclosure, the outer annular combustor and the inner annular combustor are within a common split compressor diffuser.

A further embodiment of any of the foregoing embodiments of the present disclosure includes a high pressure turbine inlet variable vane array downstream of the inner annular combustor.

In a further embodiment of any of the foregoing embodiments of the present disclosure, the high pressure turbine inlet variable vane array is upstream of the inner variable turbine vane array.

A further embodiment of any of the foregoing embodiments of the present disclosure includes an intermediate turbine rotor downstream of the outer variable turbine vane array and the inner variable turbine vane array.

In a further embodiment of any of the foregoing embodiments of the present disclosure, the outer variable turbine vane array is radially outboard of the inner variable turbine vane array.

In a further embodiment of any of the foregoing embodiments of the present disclosure, the outer variable turbine vane array and the inner variable turbine vane array are radially inline and separated by a downstream annular extension of a split compressor diffuser that contains the outer annular combustor and the inner annular combustor.

A gas turbine engine according to another disclosed non-limiting embodiment of the present disclosure includes an outer annular combustor, an inner annular combustor radially inboard of the outer annular combustor, and a high pressure turbine inlet variable vane array downstream of the inner annular combustor.

A further embodiment of any of the foregoing embodiments of the present disclosure includes an outer variable turbine vane array downstream of the outer annular combustor, and an inner variable turbine vane array downstream of the inner annular combustor.

In a further embodiment of any of the foregoing embodiments of the present disclosure, the high pressure turbine inlet variable vane array is upstream of the inner variable turbine vane array.

In a further embodiment of any of the foregoing embodiments of the present disclosure includes an intermediate turbine rotor downstream of the outer variable turbine vane array and the inner variable turbine vane array.

A further embodiment of any of the foregoing embodiments of the present disclosure, the outer variable turbine vane array is radially outboard of the inner variable turbine vane array.

In a further embodiment of any of the foregoing embodiments of the present disclosure, the outer variable turbine vane array and the inner variable turbine vane array are radially inline and separated by a downstream annular extension of a split compressor diffuser that contains the outer annular combustor and the inner annular combustor.

A method of operating a gas turbine engine according to another disclosed non-limiting embodiment of the present disclosure includes scheduling fuel flow to an outer annular combustor and an inner annular combustor, scheduling a position of an outer variable turbine vane array downstream of the outer annular combustor and controlling a position of an inner variable turbine vane array downstream of the inner annular combustor, and scheduling a position of a high pressure turbine inlet variable vane array downstream of the inner annular combustor.

A further embodiment of any of the foregoing embodiments of the present disclosure includes closing the outer variable turbine vane array for takeoff operation mode.

A further embodiment of any of the foregoing embodiments of the present disclosure includes opening the high pressure turbine inlet variable vane array.

A further embodiment of any of the foregoing embodiments of the present disclosure includes providing relatively more fuel flow into the outer annular combustor relative to the fuel flow into the inner annular combustor for takeoff operation mode.

A further embodiment of any of the foregoing embodiments of the present disclosure includes nominally positioning the outer variable turbine vane array for cruise operation mode.

A further embodiment of any of the foregoing embodiments of the present disclosure includes closing the high pressure turbine inlet variable vane array.

A further embodiment of any of the foregoing embodiments of the present disclosure includes providing relatively less fuel flow into the outer annular combustor relative to the fuel flow into the inner annular combustor for cruise operation mode.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4 is a tabulation of example operational mode schedules for the variable cycle gas turbine engine of FIG. 1.

DETAILED DESCRIPTION

Figure 1:
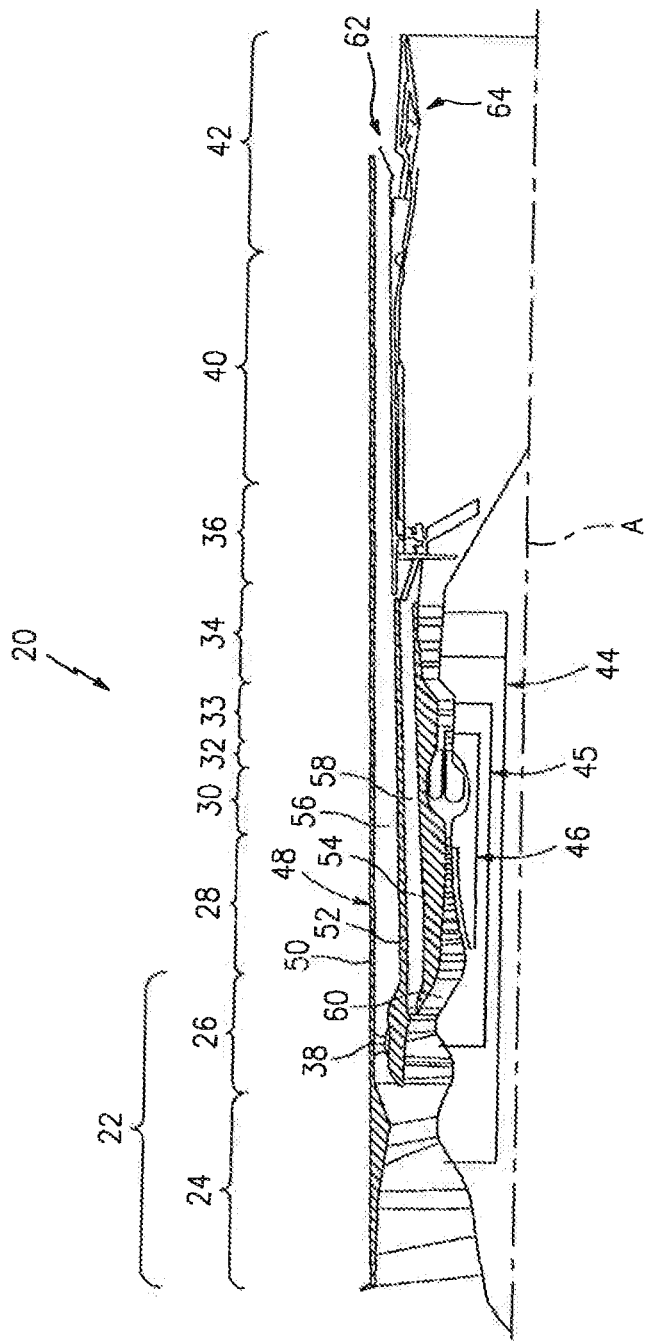
FIG. 1 is a schematic view of an exemplary variable cycle gas turbine engine with a nested combustor section.

FIG. 1 schematically illustrates a gas turbine engine 20. The gas turbine engine 20 is disclosed herein as a variable cycle three-spool bypass turbofan that generally includes: a fan section 22 with a first stage fan section 24 and a second stage fan section 26; a high pressure compressor section 28; a nested combustor section 30; a high pressure turbine section 32; an intermediate pressure turbine section 33; a low pressure turbine section 34; an augmentor section 36; an exhaust duct section 40; and a nozzle section 42. Additional sections, systems and features such as a geared architecture that may be located in various engine sections, for example, forward of the second stage fan section 26 or aft of the low pressure turbine section 34. Additional sections, systems and features such as a low pressure compressor, may be located aft of the second stage fan section 26 and forward of the high pressure compressor section 28. The sections are defined along a central longitudinal engine axis A.

Figure 3:
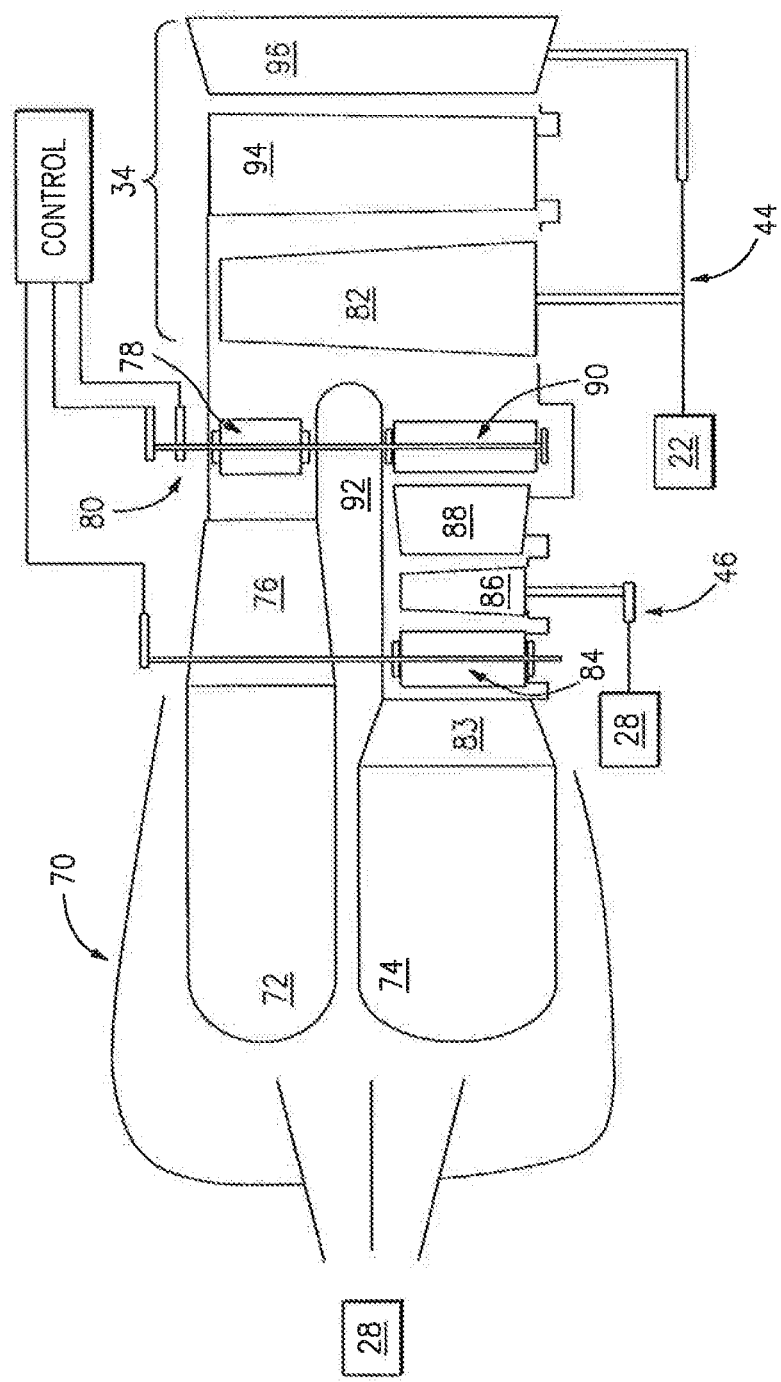
FIG. 3 is an expanded schematic view of a two-spool architecture variable cycle gas turbine engine of FIG. 1 according to another non-limiting embodiment.

The engine 20 generally includes a low spool 44, an intermediate spool 45 and a high spool 46 that rotate about the engine central longitudinal axis A relative to an engine case structure 48. Other architectures, such as three-spool architectures, will also benefit herefrom (FIG. 3).

The engine case structure 48 generally includes an outer case structure 50, an intermediate case structure 52 and an inner case structure 54. It should be understood that various structures individual or collectively may define the case structures 48 to essentially define an exoskeleton that supports the spools 44, 45, 46 for rotation therein.

The first stage fan section 24 communicates airflow through an airflow control mechanism 38 into a third stream airflow path 56 as well as into a second stream airflow path 58 and a core primary airflow path 60 that is in communication with the augmentor section 36. The airflow control mechanism 38 may include various structures such as electrical, pneumatic or mechanical operated blocker doors, variable vanes and others that operate as a throttle point to define a variable area throat. The airflow control mechanism 38 is selectively operable to control airflow through the third stream airflow path 56 such that a selective percentage of airflow from the first stage fan section 24 is divided between the third stream airflow path 56 as well as both the second stream airflow path 58 and core primary airflow path 60. In the disclosed non-limiting embodiment, the airflow control mechanism 38 may throttle the airflow into the third stream airflow path 56 down to a minimal but non-zero airflow.

The second stage fan section 26 communicates airflow into the second stream airflow path 58 and the core primary airflow path 60. The second stage fan section 26 is generally radially inboard and downstream of the airflow control mechanism 38 such that all airflow from the second stage fan section 26 is communicated into the second stream airflow path 58 and the core primary airflow path 60. The fan section 22 may alternatively or additionally include other architectures that, for example, include additional or fewer stages each with or without various combinations of variable or fixed guide vanes.

The core primary airflow is compressed by the first stage fan section 24, the second stage fan section 26, the high pressure compressor section 28, mixed and burned with fuel in the nested combustor section 30, then expanded over the high pressure turbine section 32, the intermediate pressure turbine section 33 and the low pressure turbine section 34. The turbines sections 34, 33, 32 rotationally drive the respective low spool 44, intermediate spool 45 and high spool 46 in response to the expansion. Each of the turbine sections 32, 33, 34 may alternatively or additionally include other architectures that, for example, include additional or fewer stages each with or without various combinations of variable or fixed guide vanes.

The third stream airflow path 56 is generally annular in cross-section and defined by the outer case structure 50 and the intermediate case structure 52. The second stream airflow path 58 is also generally annular in cross-section and defined by the intermediate case structure 52 and the inner case structure 54. The core primary airflow path 60 is generally circular in cross-section and defined by the inner case structure 54. The second stream airflow path 58 is defined radially inward of the third stream airflow path 56 and the core primary airflow path 60 is radially inward of the second stream airflow path 58. Various crossover and cross-communication airflow paths may be alternatively or additionally provided.

The nozzle section 42 may include a third stream exhaust nozzle 62 (illustrated schematically) which receives airflow from the third stream airflow path 56 and a mixed airflow exhaust nozzle 64 (illustrated schematically) which receives a mixed airflow from the second stream airflow path 58 and the core primary airflow path 60. It should be understood that various fixed, variable, convergent/divergent, two-dimensional and three-dimensional nozzle systems may be utilized herewith.

Figure 2:
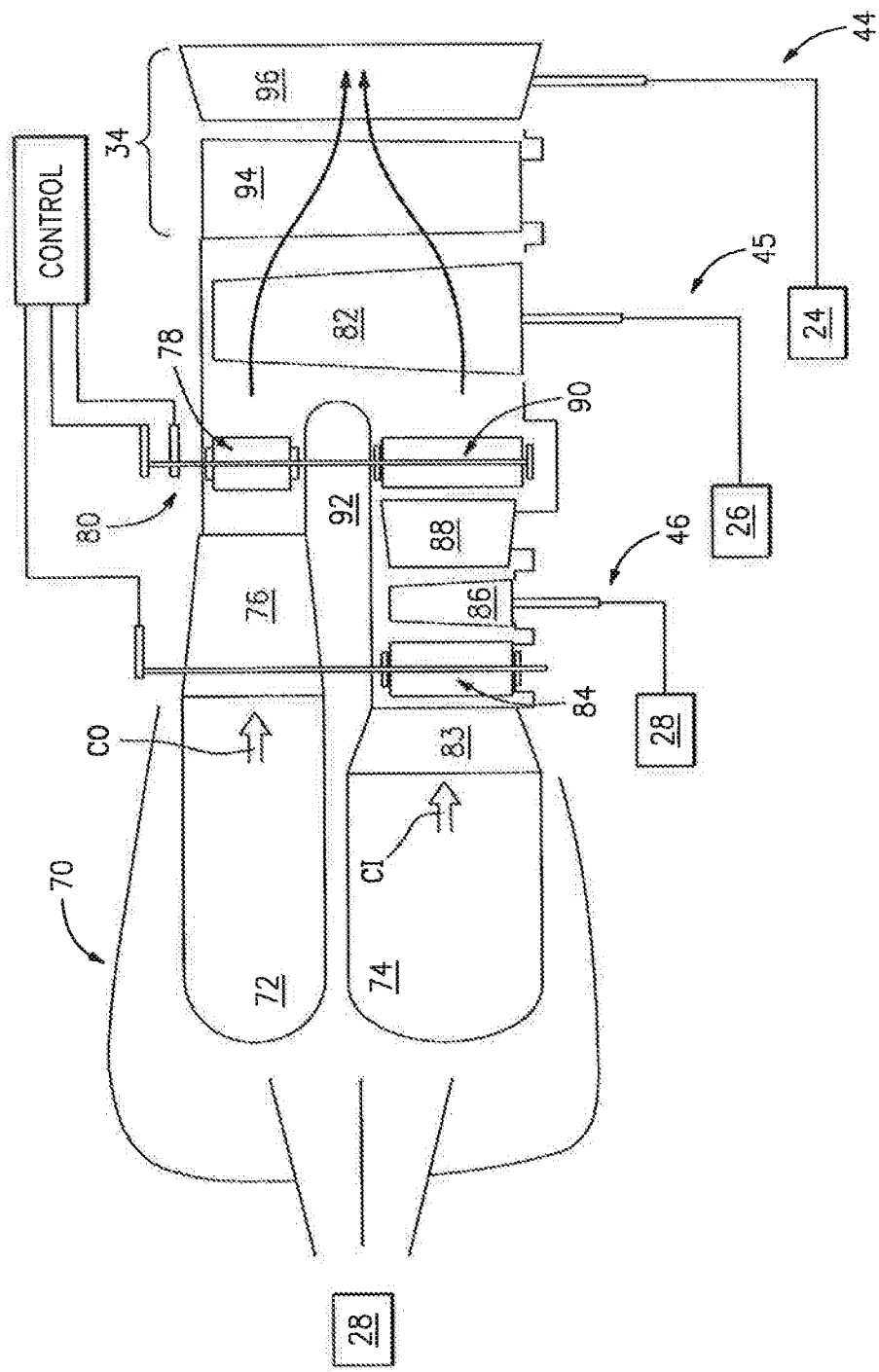
FIG. 2 is an expanded schematic view of a three-spool architecture variable cycle gas turbine engine of FIG. 1 according to one non-limiting embodiment.

With reference to FIG. 2, the nested combustor section 30 includes a common split compressor diffuser 70 with an outer annular combustor 72 and an inner annular combustor 74. The split compressor diffuser 70 directs compressed airflow from the high pressure compressor section 28 to the outer annular combustor 72 and the inner annular combustor 74 in a generally equal distribution. The outer annular combustor 72 and the inner annular combustor 74 are also of generally equivalent volume.

The outer annular combustor 72 discharges to an outer fixed turbine vane array 76 of, in one disclosed non-limiting embodiment, the intermediate pressure turbine section 33 thence to an outer variable turbine vane array 78 of a nested turbine variable vane array 80. The outer variable turbine vane array 78 is upstream of an intermediate turbine rotor 82 or alternatively, in a two spool two-spool architecture, a first stage of the low pressure turbine section 34 (FIG. 3).

The inner annular combustor 74 discharges to an inner fixed turbine vane array 83, thence to a high pressure turbine inlet variable vane array 84, thence to a high pressure turbine rotor 86 of the high pressure turbine section 32. It should be appreciated that various electrical, mechanical and/or pneumatic actuators may be utilized to change the rotation position of the high pressure turbine inlet variable vane array 84 to selectively throttle the combustion gas flow with, for example a sync ring or other structure.

A high pressure turbine exit guide vane array 88 is downstream of the high pressure turbine rotor 86, and upstream of an inner variable turbine vane array 90 of the nested turbine variable vane array 80. The high pressure turbine exit guide vane array 88 may include variable or fixed guide vanes. The inner variable turbine vane array 90 is upstream of the intermediate turbine rotor 82 or alternatively, the first stage of the low pressure turbine section 34 (FIG. 3).

The outer variable turbine vane array 78 and the inner variable turbine vane array 90 are radially inline and separated by a downstream annular extension 92 of the split compressor diffuser 70. That is, the outer variable turbine vane array 78 and the inner variable turbine vane array 90 may be located along a common actuation axis for the nested turbine variable vane array 80. It should be appreciated that various electrical, mechanical and/or pneumatic actuators may be utilized to separately change the rotation position of the outer variable turbine vane array 78 and the inner variable turbine vane array 90 to selectively throttle the combustion gas flow with, for example a sync ring or other structure.

The respective separate outer combustion gas stream (illustrated schematically by arrow CO) from the outer annular combustor 72 and the inner combustion gas stream (illustrated schematically by arrow CI) from the inner annular combustor 74 drive the intermediate turbine rotor 82. That is, the intermediate turbine rotor 82 radially spans the outer variable turbine vane array 78 and the inner variable turbine vane array 90. Downstream of the downstream annular extension 92 the merged combustion gas streams continue over a low pressure turbine vane array 94 and low pressure turbine rotor 96 of the low pressure turbine section 34.

Figure 4:
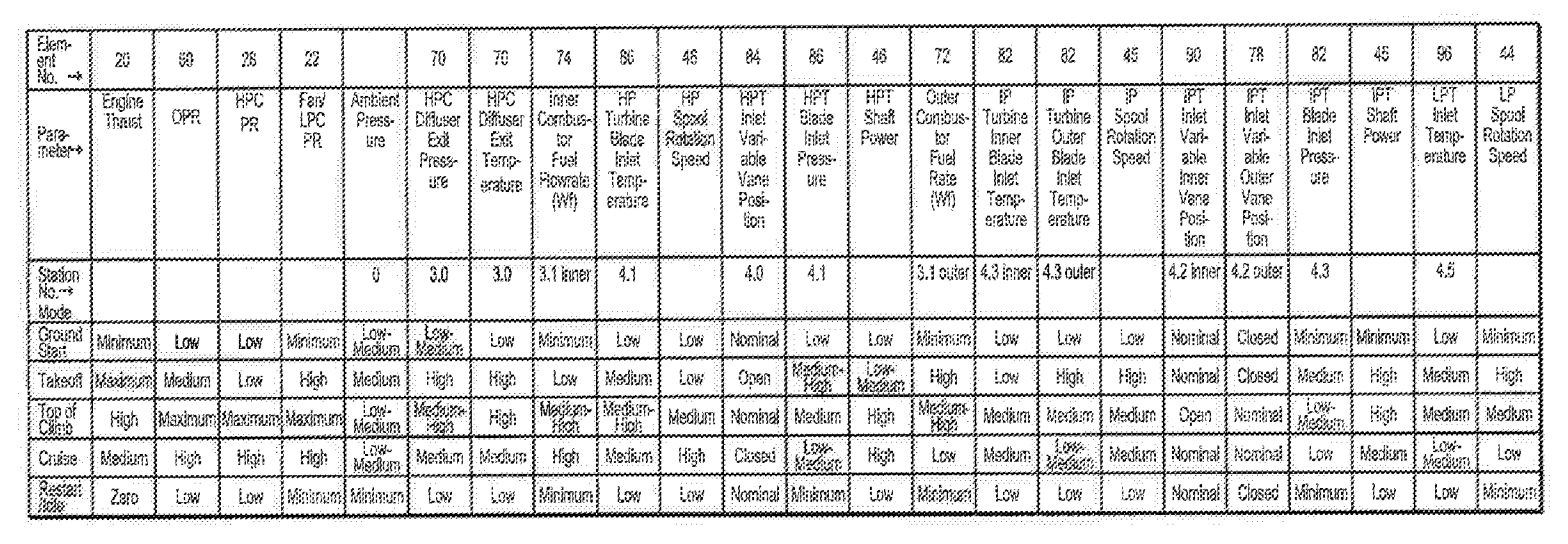

With reference to FIG. 4, total and static pressure matching is achievable via scheduling of the fuel flows in the outer annular combustor 72 and the inner annular combustor 74, and via scheduling of the variable vanes, e.g., the high pressure turbine inlet variable vane array 84, the outer variable turbine vane array 78 and the inner variable turbine vane array 90. The high pressure turbine inlet variable vane array 84 controls the back pressure velocity differential to the high pressure turbine rotor 86 of the high pressure turbine section 32. The outer variable turbine vane array 78 and the inner variable turbine array 90 control the back pressure velocity differential to the intermediate pressure turbine rotor 82 of the intermediate pressure turbine section 33 or the low pressure turbine section of a two spool engine.

For a takeoff operation mode, the outer variable turbine vane array 78 are in a closed position and the inner variable turbine vane array 90 are in a nominal position while the high pressure turbine inlet variable vane array 84 are in an open position. The fuel flow into the outer annular combustor 72 is relatively high and the fuel flow into the inner annular combustor 74 is relatively low. The relatively lower temperature at the inner diameter of the intermediate turbine rotor 82 during the takeoff operational modes also facilitates reduced wear and increased durability.

In contrast to the takeoff operation mode, for a cruise operation mode, the outer variable turbine vane array 78 and the inner variable turbine vane array 90 are in a nominal position while the high pressure turbine inlet variable vane array 84 are in a closed position. The fuel flows into the outer annular combustor 72 is relatively low and the fuel flow into the inner annular combustor 74 is relatively high.

The architecture thereby maximizes engine thrust and avoids a relatively high overall pressure ratio (OPR) and overly high temperatures aft of the high pressure compressor section 28 (T3) in takeoff operation mode by burning minimal fuel in the inner annular combustor 74.

The architecture facilitates control of the temperature aft of the high pressure compressor section 28 referred to herein as T3. As further perspective, T0 is the ambient temperature of the atmosphere; T1 is a temperature in front of the fan section 22; T2 is a temperature at the blade leading edge of the second stage fan section 26; T2.5 is the temperature aft of the second stage fan section 26; and T3 is the temperature aft of the high pressure compressor 28. T4 is the temperature in the nested combustor section 30; T4.1 is the temperature at the blade leading edge of the HPT rotor 86; and T4.3 is the temperature at the blade leading edge of the intermediate pressure turbine rotor 82. T4.5 is the temperature between the high pressure turbine section 32 and either the intermediate pressure turbine section 33 or low pressure turbine section 34; and T5 is the temperature aft of the low pressure turbine section 34 (FIG. 1).

The architecture also facilitates the cruise operation mode by burning fuel optimally in the inner annular combustor 74 to provide high energy airflow to both the high pressure turbine section 32 and the intermediate pressure turbine section 33 to drive the high pressure compressor section 28 and the second stage fan section 26, respectively, to a high overall pressure ratio (OPR).

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A gas turbine engine, comprising:
an outer annular combustor;
an inner annular combustor radially inboard of said outer annular combustor;
an outer variable turbine vane array downstream of said outer annular combustor;
an inner variable turbine vane array downstream of said inner annular combustor; and
an intermediate turbine rotor downstream of said outer variable turbine vane array and said inner variable turbine vane array.

2. The gas turbine engine of claim 1, wherein said outer annular combustor and said inner annular combustor are within a common split compressor diffuser.

3. The gas turbine engine of claim 1, further comprising a high pressure turbine inlet variable vane array downstream of said inner annular combustor.

4. The gas turbine engine of claim 3, wherein said high pressure turbine inlet variable vane array is upstream of said inner variable turbine vane array.

5. The gas turbine engine of claim 1, wherein said outer variable turbine vane array is radially outboard of said inner variable turbine vane array.

6. The gas turbine engine of claim 1, wherein said outer variable turbine vane array and said inner variable turbine vane array are radially inline and separated by a downstream annular extension of a split compressor diffuser that contains said outer annular combustor and said inner annular combustor.

7. A gas turbine engine, comprising:
an outer annular combustor;
an inner annular combustor radially inboard of said outer annular combustor;
an outer variable turbine vane array downstream of said outer annular combustor; and
an inner variable turbine vane array downstream of said inner annular combustor;
wherein said outer variable turbine vane array and said inner variable turbine vane array are radially inline and separated by a downstream annular extension of a split compressor diffuser that contains said outer annular combustor and said inner annular combustor.

8. The gas turbine engine of claim 7, wherein said outer annular combustor and said inner annular combustor are within a common split compressor diffuser.

9. The gas turbine engine of claim 7, further comprising a high pressure turbine inlet variable vane array downstream of said inner annular combustor.

10. The gas turbine engine of claim 9, wherein said high pressure turbine inlet variable vane array is upstream of said inner variable turbine vane array.

11. The gas turbine engine of claim 7, further comprising an intermediate turbine rotor downstream of said outer variable turbine vane array and said inner variable turbine vane array.

12. The gas turbine engine of claim 7, wherein said outer variable turbine vane array is radially outboard of said inner variable turbine vane array.

13. A gas turbine engine, comprising:
an outer annular combustor;
an inner annular combustor radially inboard of said outer annular combustor;
a high pressure turbine inlet variable vane array downstream of said inner annular combustor;
an outer variable turbine vane array downstream of said outer annular combustor;
an inner variable turbine vane array downstream of said inner annular combustor, said high pressure turbine inlet variable vane array upstream of said inner variable turbine vane array; and
an intermediate turbine rotor downstream of said outer variable turbine vane array and said inner variable turbine vane array.

14. The gas turbine engine of claim 13, wherein said outer variable turbine vane array is radially outboard of said inner variable turbine vane array.

15. The gas turbine engine of claim 13, wherein said outer variable turbine vane array and said inner variable turbine vane array are radially inline and separated by a downstream annular extension of a split compressor diffuser that contains said outer annular combustor and said inner annular combustor.

* * * * *